US012739687B2

(12) United States Patent
Chan et al.

(10) Patent No.: US 12,739,687 B2
(45) Date of Patent: Sep. 15, 2026

(54) FREQUENCY HOPPING FOR 5G AND BEYOND WIRELESS COMMUNICATION SYSTEMS

(71) Applicants: University of Kansas, Lawrence, KS (US); Wichita State University, Wichita, KS (US)

(72) Inventors: Wai Ming Chan, Wichita, KS (US); Taejoon Kim, Lawrence, KS (US); Hyuck M. Kwon, Wichita, KS (US); Rémi A Chou, Wichita, KS (US)

(73) Assignees: University of Kansas, Lawrence, KS (US); Wichita State University, Wichita, KS (US)

( * ) Notice: Subject to any disclaimer, the term of this patent is extended or adjusted under 35 U.S.C. 154(b) by 261 days.

(21) Appl. No.: 18/747,072

(22) Filed: Jun. 18, 2024

(65) Prior Publication Data

US 2026/0059360 A1 Feb. 26, 2026

Related U.S. Application Data

(60) Provisional application No. 63/521,815, filed on Jun. 19, 2023.

(51) Int. Cl.
*H04W 24/10* (2009.01)

(52) U.S. Cl.
CPC .................................. *H04W 24/10* (2013.01)

(58) Field of Classification Search
CPC .. H04W 36/24; H04W 24/10; H04B 7/18508; H04B 7/18541; H04B 7/2041;
(Continued)

(56) References Cited

U.S. PATENT DOCUMENTS

2007/0237069 A1* 10/2007 Chang .................. H04L 1/0026 370/252
2010/0309793 A1* 12/2010 Choi .................... H04L 1/0026 370/252

(Continued)

OTHER PUBLICATIONS

"Hopping Pilot Pattern for Interference Mitigation in OFDM"; Osseiran et al.; 2008 IEEE 19th International Symposium on Personal, Indoor and Mobile Radio Communications; Dec. 2008 (Year: 2008).*

(Continued)

*Primary Examiner* — Benjamin H Elliott, IV
(74) *Attorney, Agent, or Firm* — Foley & Lardner LLP

(57) ABSTRACT

Aspects of the present disclosure are directed to systems and methods of communicating messages via channels. A base station (BS) may obtain, from a user equipment (UE), a report identifying a signal-to-interference-noise ratio (SINR) for each subcarrier of a plurality of subcarriers in a channel between the BS and the UE. The BS may receive via the plurality of subcarriers in the channel, a corresponding first plurality of symbols corresponding to a message from the UE. The BS may determine, using the SINR for each subcarrier of the plurality of subcarriers identified in the report, a sequence according to which the first plurality of symbols is assigned to the plurality of subcarriers. The BS may generate a second plurality of symbols by reordering the first plurality of symbols in accordance with the sequence. The BS may transmit the second plurality of symbols to a core network to obtain the message.

20 Claims, 9 Drawing Sheets

(58) Field of Classification Search
CPC .... H04B 7/0408; H04B 7/0695; H04B 7/088; H04B 7/1851; H04B 7/18513
See application file for complete search history.

(56) References Cited

U.S. PATENT DOCUMENTS

| | | | | |
|---|---|---|---|---|
| 2018/0076915 | A1 * | 3/2018 | Carrick | H04L 1/0009 |
| 2020/0221507 | A1 * | 7/2020 | Kim | H04L 5/0053 |
| 2025/0193861 | A1 * | 6/2025 | Son | H04L 27/266 |
| 2026/0059360 | A1 * | 2/2026 | Chan | H04W 24/10 |

OTHER PUBLICATIONS

3GPP, "5G; NR; Physical Channels and Modulation (3GPP TS 38.211 version 17.4.0 Release 17)", 3rd Generation Partnership Project (3GPP), Technical Specification (TS) 38.211, Jan. 2023, version 17.4.0, 141 pages.

3GPP, "5G; NR; Physical Layer Procedures For Control (3GPP TS 38.213 version 17.4.0 Release 17)," 3rd Generation Partnership Project (3GPP), Technical Specification (TS) 38.213, Jan. 2023, version 17.4.4, 263 pages.

Girke et al., "Towards Resilient 5G: Lessons Learned From Experimental Evaluations of LTE Uplink Jamming," in IEEE International Conference on Communications Workshops (ICC Workshops), 2019, pp. 1-6.

Hannon et al., "Jamming Statistics-Dependent Frequency Hopping", in IEEE Military Communications Conference (MILCOM), 2016, pp. 1-6.

Popovski et al., "5G Wireless Network Slicing for eMBB, URLLC, and mMTC: A Communication-Theoretic View", IEE Access, vol. 6, pp. 55765-55779, 2018.

Rao et al., "LTE PHY Layer Vulnerability Analysis and Testing Using Open-Source SDR Tools", in IEEE Military Communications Conference (MILCOM), 2017, pp. 744-749.

Royster et al., "Performance Considerations for Protected Wideband Satcom", in MILCOM 2015—2015 IEEE Military Communications Conference, IEEE, 204, pp. 175-180.

Wang et al., "Mitigating Jamming Attack: A Game-Theoretic Perspective", IEEE Transactions on Vehicular Technology, vol. 67, No. 7, pp. 6063-6074, Jul. 2018.

Wang et al., "Pilot Contamination Attack Detection for 5G MmWave Grant-Free IoT Networks", IEEE Transactions on Information Forensics and Security, vol. 16, pp. 658-670, 2021.

Wang et al., "Sequential Anomaly Detection Against Demodulation Reference Signal Spoofing in 5G NR", IEEE Transactions on Vehicular Technology, vol. 72, No. 1, pp. 1291-1295, Jan. 2023.

Xiong et al., "Optimality Conditions of Performance-Guaranteed Power Minimization in MIMO Networks: A Distributed Algorithm and Its Feasibility", IEEE Transactions on Signal Processing, vol. 69, pp. 119-135, 2021.

* cited by examiner

FREQUENCY HOPPING FOR 5G AND BEYOND WIRELESS COMMUNICATION SYSTEMS

CROSS-REFERENCE TO RELATED APPLICATION

This application claims priority to and the benefit of U.S. Provisional Application No. 63/521,815, titled "Frequency Hopping for 5G and Beyond Wireless Communication Systems," filed Jun. 19, 2023, which is incorporated herein by reference in its entirety for all purposes.

STATEMENT OF GOVERNMENT SUPPORT

This invention was made with government support under 2226447 and 2335455 awarded by the National Science Foundation. The government has certain rights in the invention.

TECHNICAL FIELD

The present application relates to the field of communications, and in particular communicating symbols over channels.

BACKGROUND

A sender communication device may transmit a message to a recipient communication device over a channel. Various conditions of the channel, such as noise and the movement of the devices relative to each other, may impact the reception of the message at the recipient communication device.

SUMMARY

Aspects of the present disclosure are directed to systems and methods of communicating messages via channels. A user equipment (UE) may obtain a signal-to-interference-noise ratio (SINR). The SINR can be for each subcarrier of a plurality of subcarriers in a channel between the UE and a base station (BS). In some embodiments, each subcarrier of the plurality of subcarriers may correspond to a symbol with a different priority. The UE may identify a first plurality of symbols corresponding to a message to be transmitted to the BS via the channel. The UE may determine, using the SINR for each subcarrier of the plurality of subcarriers, a sequence according to which the first plurality of symbols is assigned to the plurality of subcarriers. The UE may assign each symbol of the first plurality of symbols to a corresponding subcarrier of the plurality of subcarriers in accordance with the sequence. The UE may transmit, to the BS, (i) the first plurality of symbols via the plurality of subcarriers in the channel and/or (ii) a report identified the SINR for each subcarrier of the plurality of subcarriers. In some embodiments, the UE may send a high priority symbol via an OFDM subcarrier with a high SINR. The UE may send a low priority symbol via an OFDM subcarrier with a low SINR.

In some embodiments, the transmission of (i) the first plurality of symbols via the plurality of subcarriers in the channel the symbols and (ii) the report identified the SINR for each subcarrier of the plurality of subcarriers can be performed separately.

In some embodiments, the UE may identify a priority for at least one symbol of the first plurality of symbols. In some embodiments, assigning further may comprise assigning the at least one symbol to a subcarrier of the plurality of subcarriers based on (i) the priority of the at least one symbol or (ii) the SINR in the subcarrier being above a threshold.

In some embodiments, the UE may perform at least one of modulation or encoding on the first plurality of symbols reordered in accordance with the sequence. In some embodiments, obtaining the SINR may further comprise obtaining the SINR in each slot interval of a corresponding subcarrier of the plurality of subcarriers.

Aspects of the present disclosure are directed to systems and methods of communicating messages via channels. A base station (BS) may obtain, from a UE, a report identifying a signal-to-interference-noise ratio (SINR) for each subcarrier of a plurality of subcarriers in a channel between the BS and the UE. The BS may receive via the plurality of subcarriers in the channel, a corresponding first plurality of symbols corresponding to a message from the UE. The BS may determine, using the SINR for each subcarrier of the plurality of subcarriers identified in the report, a sequence according to which the first plurality of symbols is assigned to the plurality of subcarriers. The BS may generate a second plurality of symbols using the first plurality of symbols in accordance with the sequence. The BS may transmit the second plurality of symbols to a core network to obtain the message.

In some embodiments, generating the second plurality of symbols may further comprise performing at least one of a demodulation or a decoding on the first plurality of symbols reordered in accordance with the determined sequence. In some embodiments, determining the sequence may further comprise determining a priority for at least one symbol of the first plurality of symbols based on a corresponding subcarrier of the plurality subcarriers via which the at least one symbol is received.

In some embodiments, at least one symbol in the first plurality of symbols can be assigned to a subcarrier of the plurality of subcarriers based on the SINR in the subcarrier being above a threshold. In some embodiments, the report may identify the SINR in each slot interval of a corresponding subcarrier of the plurality of subcarriers.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
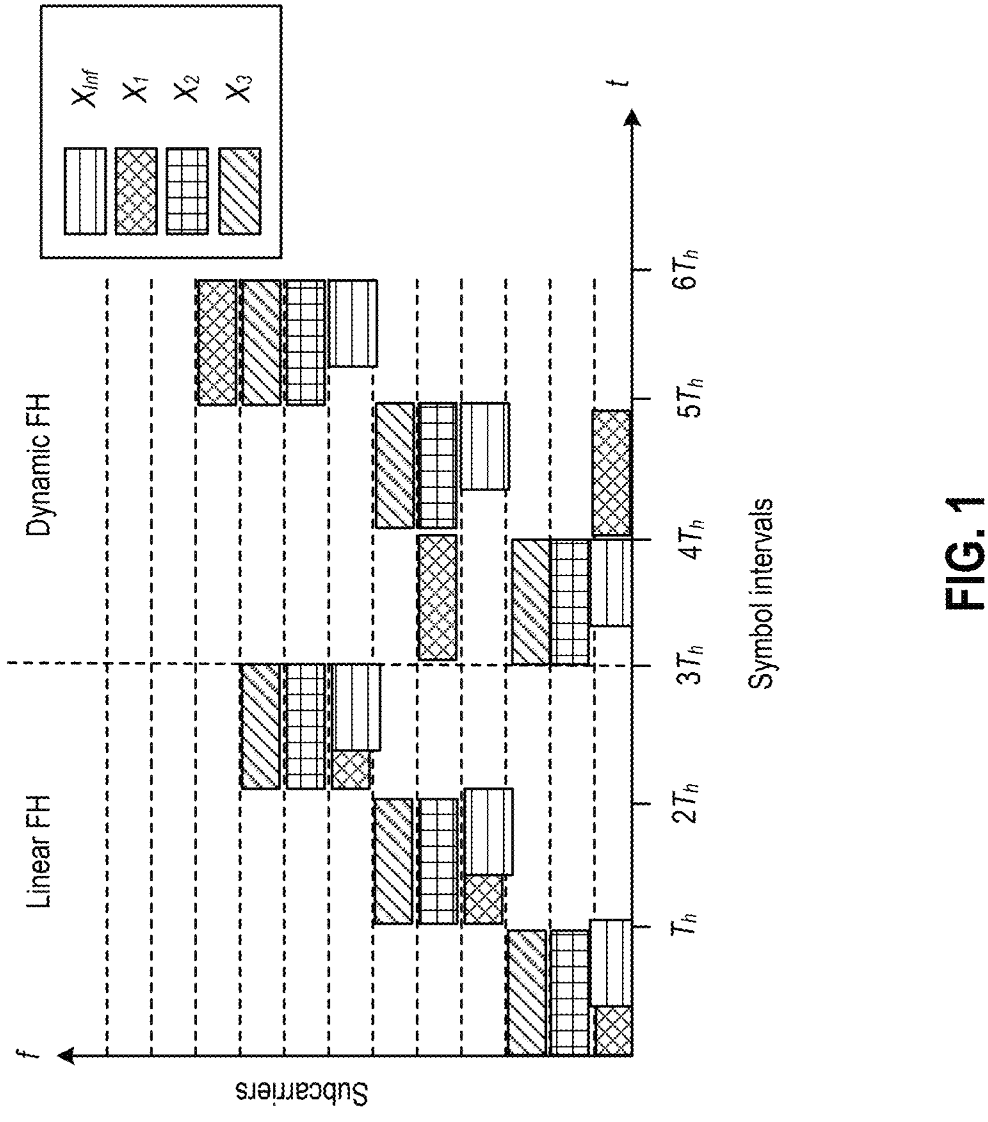
FIG. 1 illustrates a graph of an example of 5G frequency hopping (FH) patterns, in accordance with an illustrative embodiment.

Following below are more detailed descriptions of various concepts related to, and embodiments of, systems and methods for communicating symbols across subcarriers. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes adaptive frequency hopping for 5G New Radio mMTC security.

Section B describes 5G frequency hopping to communicate symbols over channels.

Section C describes a process for communicating messages via channels in accordance with frequency hopping.

A. Adaptive Frequency Hopping for 5G New Radio mMTC Security

3GPP standards (e.g., LTE and 5G New Radio (NR)) have revolutionized commercial broadband access. Unfortunately, the openness of 3GPP specifications and high-level of adaptability make fifth-generation (5G) networks increasingly sensitive to unsophisticated attacks in the network. While 5G NR has introduced frequency hopping (FH) for massive machine-type communications (mMTC), there has not been a unified approach to designing the FH patterns in practical 5G systems. In this disclosure, the multi-user FH design problem at the physical resource grid of the 5G communication networks is investigated. Various criteria for FH pattern design and propose two algorithms that are implementable with low complexity are provided. The first scheme utilizes known interference patterns to design a set of user equipment (UE) FH patterns that are immune to interfering attacks. The second scheme leverages interference statistics and minimizes the expected number of hits by the interferer. Through numerical simulations and analytical modeling, the efficacy of the proposed schemes, which outperform the uniform FH pattern and achieve near-optimal performance, is demonstrated.

1. Introduction

The fifth-generation (5G) cellular networks have been introduced to facilitate the growing demand for high-speed and reliable wireless use cases including: (i) enhanced mobile broadband (eMBB); (ii) massive machine-type communications (mMTC); and (iii) ultra-reliable low-latency communications (URLLCs). In particular, the mMTC user equipments (UEs) are allowed to use frequency hopping (FH) patterns. FH allows mMTC UEs to be flexible in accessing 5G spectrum resources and even be resilient to active interferers. When there are malicious entities capable of generating partial band interference, FH enables legitimate UEs to dynamically change their frequencies, mitigating interfering attacks as well as preventing information leakage. Unlike other mitigation methods such as pilot contamination detection and spoofing detection that are primarily concerned with threat monitoring, FH provides protection regardless of the status of threats.

While the 3GPP specifications provide unified standardization across multiple mobile network operators, its openness to the public has been making the 5G cellular networks increasingly fragile. This is mainly because cellular networks have primarily been designed to achieve the fundamental limits of traditional wireless channel models without the purposeful introduction of Zero Trust. In the 5G New Radio (NR) specifications, the base station (BS) coordinates the physical layer resource allocation with the user equipment (UE) through the control-resource set (CORESET) over the downlink control channel (PDCCH). The 3GPP specifications specify the locations of the CORESET. Any capable malicious entities can learn the CORESET by snooping the resource allocation information. On the other hand, the intra-slot FH option in the 5G physical uplink control channel (PUCCH) allows the FH at each orthogonal frequency division multiplexing (OFDM) symbol within a slot time. The effectiveness of the intra-slot FH in PUCCH is largely dependent on the hopping rate and hopping pattern. This hopping information is public and malicious entities can exploit it to generate interference; it was shown that harm can be done by using even unsophisticated software-defined radios (SDRs). It is well known in the game theory literature that both the optimum UE FH pattern against an interferer and the most harmful interfering FH pattern against a UE FH pattern should be uniformly random. This is true when both interferer and UE play a game in which an interferer aims to maximize the number of hits with the FH UE while the FH UE aims to minimize the hits by the interferer. This direction is aligned with the existing protected tactical waveform (PTW) for a current military satellite communication system, which assumes the interfering FH patterns are uniformly random over the entire frequency band. Then, the optimum signal FH pattern against this uniform FH interference is also uniform logically. In addition, to maximize the spectrum utilization, an FH UE uses the entire band uniformly also. Therefore, the existing PTW adopted uniform FH patterns for all UEs. However, in practice, an intelligent interferer can jam only the targeted UE signals rather than the entire band to save its power and maximize its interference efficacy. This is the motivation for the proposed investigation.

In this disclosure, the problem of FH pattern design for 5G NR mMTC UEs presented at the physical resource grid in 5G terrestrial communication networks is investigated. The problem is challenging due to the substantial computational overhead associated with the FH patterns for numerous mMTC UEs with short hopping intervals. The challenge by formulating the FH pattern design problem at the 5G PUCCH that prevents both attackers and friendly UE collisions is addressed. Two FH schemes are provided: one that utilizes known interference patterns, and another that utilizes only the interference statistics. Simulation results illustrate improved protection performance against interference for our proposed schemes compared to the traditional uniform FH scheme.

The proposed adaptive FH scheme can be implemented without modifying 5G standards because the uplink and downlink frequency ranges and time slots can be scheduled by a BS or requested by UEs. Once the frequency range and time slots are assigned, multiple UEs' symbols can be permuted at a gateway on the UE side, which is equivalent to a subcarrier permutation within an OFDM symbol interval. Subcarrier permutations can be scheduled by a BS or a gateway at the UE side to achieve the desired FH patterns. A cooperative BS can distribute the FH pattern key to each UE via downlink control information (DCI). In the case of a non-cooperative and zero-trusted BS, a UE can request a schedule using uplink control information (UCI).

II. System Model & Criteria

Consider a BS serving $N_u$ mMTC UEs in the 5G NR resource block and OFDM modulation with $N_s$ available subcarriers. Each UE could access at least one subcarrier in one OFDM symbol duration if $N_u \leq N_s$; otherwise, time-division multiple access (TDMA) is adopted. Intra-slot FH is allowed for UE subcarrier allocation where one slot time consists of Na FH intervals and the duration of each FH interval is $T_h$. For the intra-slot frequency hopping in PUCCH, a FH pattern represents the sequence of subcarrier location carrying the demodulation reference signals (DMRS) of each mMTC UE. The FH pattern of UE i is denoted by a sequence $X_i=(X_i[[1], \ldots, X_i[N_h])\in \mathcal{F}^{N_h}$ where $\mathcal{F}=\{f_1, \ldots, f_{N_a}, f_{null}\}$ is the subcarrier alphabet set and $f_{null}$ is the null subcarrier used for an OFF state in an intermittent FH. The intermittent FH is not considered.

Suppose the physical channels suffer from multi-tone interference with the ability to obstruct $N_{Inf}\geq 1$ subcarriers. Denote the interference FH pattern in one time slot as the sequences $X_{inf,l}\in \mathcal{F}^{N_h}$, for $l=1, \ldots, N_{inf}$. We assume that the FH pattern of a multi-tone interferer is measurable at the end of each time slot. This assumption is practical because the FH patterns of friendly UEs are known by the BS, and the signal-to-noise ratio (SNR) can be measured at each FH interval. If the SNR is smaller than a normal operational SNR, then the corresponding subcarrier is likely to be interfered.

Illustrative Example: FIG. 1 shows an example of FH patterns of a set of UEs and an interferer, where each UE only occupies a single subcarrier at one FH interval of $T_h$. In the example, $N_u=4$, $N_s=12$, $N_h=3$, and $N_{Inf}=1$ are assumed. In the first time slot (i.e., first three FH intervals), the FH patterns of UEs and interferer can be represented as $X_1=(f_1, f_4, f_7)$, $X_2=(f_2, f_5, f_8)$, $X_3=(f_3, f_6, f_9)$, and $X_{Inf}=(f_1, f_4, f_7)=X_1$, respectively. All three UEs adopted linear FH patterns, and the interferer targets the UE 1. The whole UE 1's FH pattern is interfered because the adversary can easily acquire the FH knowledge if it is linear. In the second time slot, the UE 1 changes its linear pattern dynamically to $X_1=(f_5, f_1, f_{10})$, and the FH patterns for other UEs remain the same. The interferer's attack on UE 1 is unsuccessful in the second time slot.

A. Frequency Hopping Pattern Design Criteria

The most common approach used to measure the distance between two (binary) sequences employs Hamming distance. Two Hamming distance-related metrics, the number of successes and the number of hits are proposed. The present disclosure also employs traditional multiple-access communication performance such as minimum signal-to-interference-plus-noise ratio (SINR).

1) Number of successes: We count the number of successful transmissions for all UEs in the one-time slot by using given FH patterns $X_1, \ldots, X_{N_u}$. Let $$f^*_{i,n} = X_i[n]$$

denote the subcarrier index assigned to UE i at the n-th FH interval conditioned on $X_i[n]\neq f_{null}$. The number of successes at the n-th FH interval can be written as $$N_{success,n} = \sum_{i=1}^{N_u}\left(\prod_{\substack{i'\neq i\\ i'=1}}^{N_u} 1_{\{X_{i'}[n]\neq f^*_{i,n}\}}\right)\left(\prod_{l=1}^{N_{inf}} 1_{\{X_{Inf,l}[n]\neq f^*_{i,n}\}}\right).$$

where $1_{\{\cdot\}}$ denotes the indicator function. The total number of successes for the whole time slot can then be computed by $$N_{success} = \sum_{n=1}^{N_h} N_{success,n}. \tag{1}$$

The computation of (1) has the complexity $$O(N_h N_u^2 N_{inf})$$

which grows quadratically with $N_u$.

2) Number of hits: Similar to the number of successes, one can also compute the number of hits of UE i as $N_{hit,i,n}=|I_{i,n}|+|L_{i,n}|$, where $I_{i,n}=\{i': X_{i'}[n]=X_i[n]\neq f_{null}, 1\leq i'\leq N_u\}$ and $L_{i,n}=\{l: X_{inf,l}[n]=X_i[n], 1\leq l\leq N_{Inf}\}$, respectively, are the set of UE indices and the set of interferer indices causing interference to UE i at the n-th interval. The total number of hits during the entire time slots is given by $$N_{hit} = \sum_{n=1}^{N_h}\sum_{i=1}^{N_u} N_{hit,i,n}. \tag{2}$$

The computation of (2) has the complexity $$O(N_h(N_u^2 + N_{inf}))$$

which is within the same order as (1).

3) SINR: For any given FH patterns, we can compute the SINR of the UE i at the n-th FH interval as $$\gamma_{i,n} = \frac{P_{S,i,n}}{\sigma_N^2 + \sum_{i'\in L_{i,n}} P_{S,i',n} + \sum_{l\in L_{i,n}} P_{J,l,n}} \tag{3}$$

where $P_{S,i,n}$, $P_{J,l,n}$, and $$\sigma_N^2,$$

respectively, are the received UE i signal power at the n-th FH interval, the received interference power of interferer's l-th tone at the n-th FH interval, and the received noise power. To measure the quality of service (QoS) in terms of the fairness, we employ the minimum SINR in a whole time slot as $$\min_{1\le i\le N_u}\left\{\sum_{n=1}^{N_h}\gamma_{i,n}\right\} \quad (4)$$

The computation complexity of the minimum SINR in (4) is the same as that of the total number of hits in (2). In some embodiments, the SINR can be determined by a base station or a user equipment.

B. SINR Bound and Its Surrogate

When the received power values of a UE and interferer to occupy one subcarrier are equal, i.e., $P_{S,i,n}=P_{J,I,n}=P_S$, ∀i, l, which is the case when the BS employs uplink power control to mitigate the near-far effects, the maximization of minimum SINR can be linked to the minimum number of hits as follows. From (3), the SINR of UE i for the whole time slot can be bounded as $$\gamma_i=\sum_{n=1}^{N_h}\left(\frac{\sigma_N^2}{P_S}+\sum_{i'\in\mathcal{L}_{i,n}}1\right)^{-1}=\sum_{n=1}^{N_h}\left(\frac{\sigma_N^2}{P_S}+N_{hit,i,n}\right)^{-1}\overset{(a)}{\ge}N_h^2\left(N_h\frac{\sigma_N^2}{P_S}+N_{hit,i}\right)^{-1},$$

where (a) is due to Jensen's inequality applied to a convex function $f(x)=x^{-1}$ for x>0 and $$N_{hit,i}=\sum_{n=1}^{N_h}N_{hit,i,n}$$

denotes the number of hits of UE i in one slot. Thus, we have $\min_i$ $$\gamma_i\ge N_h^2\min_i\left(N_h\frac{\sigma_N^2}{P_S}+N_{hit,i}\right)^{-1}\text{ and} \quad (5)$$

$$\max_{\{X_1,\dots,X_{N_u}\}}\min_i\gamma_i\ge N_h^2\max_{\{X_1,\dots,X_{N_u}\}}\min_i\left(N_h\frac{\sigma_N^2}{P_S}+N_{hit,i}\right)^{-1}.$$

The solution on the right-hand-side (RHS) is equivalent to $$\underset{\{X_1,\dots,X_{N_u}\}}{\operatorname{argmax}}\min_i\left(N_h\frac{\sigma_N^2}{P_S}+N_{hit,i}\right)^{-1}=\underset{\{X_1,\dots,X_{N_u}\}}{\operatorname{argmin}}\max_i N_{hit,i}. \quad (6)$$

It is shown that the max-min SINR optimization is often complicated due to its combinatorial nature. Instead, we leverage its lower bound in (5), which is equivalent to minimizing the maximum number of hits on the RHS of (6). Exploiting the tractability offered by (6) provides insights into the optimal FH pattern design with low-complexity algorithms.

III. Frequency Hopping Pattern Designs

FH pattern-solving criteria were described earlier. In this section, we present two greedy schemes for solving (6).

A. Interference Scenario

Assuming the interference FH patterns $X_{Inf,l}$ for l=1, . . . , $N_{Inf}$ are given, BS designs the FH patterns at each FH interval independently according to the criterion in (6), which is described in Algorithm 1. At each FH interval, we initialize the collision set/as an empty set and compute the interference set J to contain all interfered subcarriers from $X_{Inf,l}$/[n], ∀l. It is straightforward to conclude that the known-interference pattern case assumed in this subsection can always ensure zero number of hits. In Algorithm 1, the FH patterns are assigned to each UE in sequential order. The UE i FH location $X_i$[n] is picked uniformly from the collision-free set F\(J∪I), where \ denotes set subtraction. Then the collision set/is updated to include the UE i's pattern $X_i$[n]. The UE assignment is repeated until all UEs are assigned or the collision-free set F \(J∪I) becomes empty. In the 5G NR setting, a large amount of mMTC UEs are supported, i.e., $N_u$>$N_s$=|F|. Thus, TDMA to divide multiple user access is considered, i.e., $X_i(n)=f_{null}$ for i≥|F \J|. Algorithm 1 outlines the above-mentioned FH pattern design procedure.

Algorithm 1 Procedures of FH pattern design under known interference FH pattern

```
1:  Input
2:      {X_inf,l: l = 1, ... , N_inf} Interferer's pattern
3:  Output
4:      {X_i ∈ F^{N_h} : i = 1 ... , N_u} UE's FH patterns
5:  for n = 1, ... , N_h do
6:      Initial condition: I = Ø
7:      Initial condition: J = {X_inf,l[n]: ≤ l ≤ N_inf}
8:      for i = 1, ... , N_u do
9:          if i ≥ | F \ J | then
10:             X_i[n] ← f_null
11:         else
12:             X_i[n] ← uniform( F \( J ∪ I ))
13:             I ← { I , X_i [n]}
14:         end if
15:     end for
16: end for
```

The assumption of known interference pattern is not practical and, in our disclosure, the former scenario is only considered as a baseline for the evaluation (see Section IV). Therefore, we next consider the FH pattern design based on interference statistics as we assume the interference pattern is randomized under some unknown distributions.

B. Statistical Interference Scenario

Same as Algorithm 1, the statistical FH pattern design is done sequentially. The design is based on the conditional probability of interference statistics. Since we assign the UE pattern sequentially, the interference at the UE i consider the UE [1, . . . , i−1]'s patterns as interference.

Suppose we are given an interference probability vector $p^I\in\mathcal{P}^{N_a}$ which is stationary over the time slot, and $\mathcal{P}^{N_a}$ denotes the unit (probability) simplex such that $$\sum_{i=1}^{N_a}p_i^I=1,\ p_i^I$$

denotes the i-th entry of $p^I$, and the probability of the index of each interference subcarrier is independent and identically distributed (i.i.d.). Unlike the known interference pattern case in Algorithm 1, the FH design criterion in (6) is now changed to minimizing the maximum expected number of hits with interference-plus-collision probability $p^{I+C}$:

$$\underset{\{X_1,\dots,X_{N_u}\}}{\operatorname{argmin}}\max_i E[N_{hit,i}]=\underset{\{X_1,\dots,X_{N_u}\}}{\operatorname{argmin}}\max_i\langle e_i,p^{I+C}\rangle, \quad (7)$$

where ⟨·,·⟩ denotes the vector inner product, $e_i\in\{0,1\}^{N_a}$ denotes a one-hot vector with 1 at the i-th entry, and the interference-plus-collision probability $p^{I+C}$ which will be discussed in below.

At the n-th FH interval, we initialize the empirical probability of interference-plus-collision as $$p_{j,i,n}^{I+C} = p^I.$$

Unlike the sequential UE assignment in Step 8 of Algorithm 1, if the UE assignment is conducted sequentially based on the criterion in (7), the same FH pattern may be repeatedly assigned at every hop interval. To ensure the randomness of FH patterns, the UE assignment order requires permutation for every FH interval. Algorithm 2 depicts the proposed sequential procedure based on the interference statistics. At every time interval, we re-generate a permutation set M and assign the pattern sequentially according to the permutation set M. At the UE i's FH pattern allocation, the empirical probability of interference-plus-collision for subcarrier $f_j$ is computed by counting the number of occupancies of the subcarrier $f_j$ as $$p_{j,i,n}^{I+C} = \frac{\sum_{l=1}^{N_{inf}} Pr(X_{Inf,l}[n] = f_j) + \sum_{i'=1}^{i-1} 1_{\{X_{i'}[n]=f_i\}}}{N_{inf} + \sum_{i'=1}^{i-1} 1_{\{X_{i'}[n]\neq f_{null}\}}} \overset{(a)}{=} \tag{8}$$

$$\frac{N_{Inf} p_j^I + \sum_{i'=1}^{i-1} 1_{\{X_i[n]=f_j\}}}{N_{inf} + \sum_{i'=1}^{i-1} 1_{\{X_{i'}[n]\neq f_{null}\}}} = \left(\frac{N_{inf} + \sum_{i'=1}^{i-2} 1_{\{X_{i'}[n]\neq f_{null}\}}}{N_{inf} + \sum_{i'=1}^{i-1} 1_{\{X_{i'}[n]\neq f_{null}\}}}\right) p_{j,i-1,n}^{I+C} +$$

$$\underbrace{\left(\frac{1_{\{X_{i-1}[n]\neq f_{null}\}}}{N_{inf} + \sum_{i'=1}^{i-1} 1_{\{X_{i'}[n]\neq f_{null}\}}}\right)}_{\triangleq \Phi_{i,n}} 1_{\{X_{i-1}[n]=f_j\}} =$$

$$(1-\Phi_{i,n}) p_{j,i-1,n}^{I+C} + \Phi_{i,n} 1_{\{X_{i-1}[n]=f_j\}}$$

where (a) is due to the i.i.d. interference assumption. At each UE i's pattern assignment, we first compute the probability in (8) via Steps 11-13 of Algorithm 2. To satisfy the criterion in (7) sequentially, the UE i's FH pattern is computed by finding the index of the minimum entry in the probability of interference-plus-collision vector $$p_{j,i,n}^{I+C},$$

i.e., $$X_i[n] = \text{argmin}_j \langle e_j, p_{:,i,n}^{I+C} \rangle$$

in Step 15 of Algorithm 2. After UE i's FH pattern $X_i[n]$ is found, we update the $$p_{j,i,n}^{I+C}$$

in Steps 11-13 and solve the UE (i+1)'s FH pattern in Step 15. The greedy approach applied in Algorithm 2 reduces the total computation complexity to $O(N_h N_u N_s)$.

Algorithm 2 Procedures of FH pattern assignment under interference statistical

| | |
|---|---|
| 1: | Input |
| 2: | $p^I \in \mathcal{P}^{N_s+1}$ interference pmf vector |
| 3: | Output |
| 4: | $\{X_i \in \mathcal{F}^{N_h} \mid i = 1, \ldots, N_u\}$ UE's FH patterns |
| 5: | for n = 1, ... , $N_h$ do |
| 6: | $\Phi_{1,n} \leftarrow N_{Inf}^{-1}$ |
| 7: | $p_{:,1,n}^{I+C} \leftarrow p^I$ |
| 8: | $\mathcal{M} \leftarrow \text{perm}(\{1, \ldots, N_u\})$ |
| 9: | for i ∈ $\mathcal{M}$ do |
| 10: | if i ≥ 2 then |
| 11: | $\Phi_{i,n} \leftarrow \left(\Phi_{i-1,n}^{-1} + 1_{\{X_{i-1}[n]\neq f_{null}\}}\right)^{-1}$ |
| 12: | $p_{:,i,n}^{I+C} \leftarrow p_{:,i-1,n}^{I+C}$ |
| 13: | $p_{:,i,n}^{I+C} \leftarrow (1-\Phi_{i,n}) p_{:,i,n}^{I+C} + \Phi_{i,n} 1_{\{X_{i-1}[n]=f_j\}}$ |
| 14: | end if |
| 15: | $X_i[n] \leftarrow \underset{1\leq j\leq N_s}{\text{argmin}}\, p_{j,i,n}^{I+C}$ |
| 16: | end for |
| 17 | end for |

IV. Simulation Studies

In this section, Simulations evaluate Algorithms 1 and 2, comparing their performance with a uniform FH scheme used in existing PTW systems. Each curve is based on 10,000 Monte Carlo iterations. We chose the 5G NR resource block numerology μ=1 corresponding to the subcarrier spacing Δf=30 kHz, and set the bandwidth B=50 MHz with the number of usable subcarriers $N_s$=1620. The slot time is set to 0.5 ms and each slot time contains $N_h$=14 OFDM symbols. The number of UEs is set to $N_u$=3032 and the number of interference subcarriers is set to $N_{Inf}$=512. The indices of interference subcarriers follow i.i.d. truncated-Gaussian distribution with a mean of 810 (i.e., the center subcarrier) and a standard deviation of 128.

We compare our proposed statistical FH pattern design (Algorithm 2) with the following benchmarking schemes: (i) Interference Free (IF) refers to zero interference case which reveals the best performance; (ii) Non-causally-known FH (NCKFH) pattern represents the scenario in Algorithm 1 where the interference pattern is known in the current time slot; (iii) Causally-known FH (CKFH) pattern represents the scenario in Algorithm 1 where the interference pattern of the previous time slot is only known; (iv) Uniform FH (UFH) pattern indicates the uniform FH; and (v) No FH (NFH) stands for the case without FH.

For our proposed FH pattern design scheme, we consider two scenarios: (i) Statistical FH with prior (SFHwP) refers to the statistical FH pattern designed with the true interference probability p/in Algorithm 2 and (ii) Statistical FH without prior (SFHwoP) refers to the statistical FH pattern designed without true Interference probability and the p' is replaced by an empirical interference probability $\hat{p}^I$ fin Algorithm 2. In case (ii), Algorithm 2 needs an extra step to update the empirical interference probability vector $\hat{p}^I$ at every time slot which is low complexity.

Figure 2:
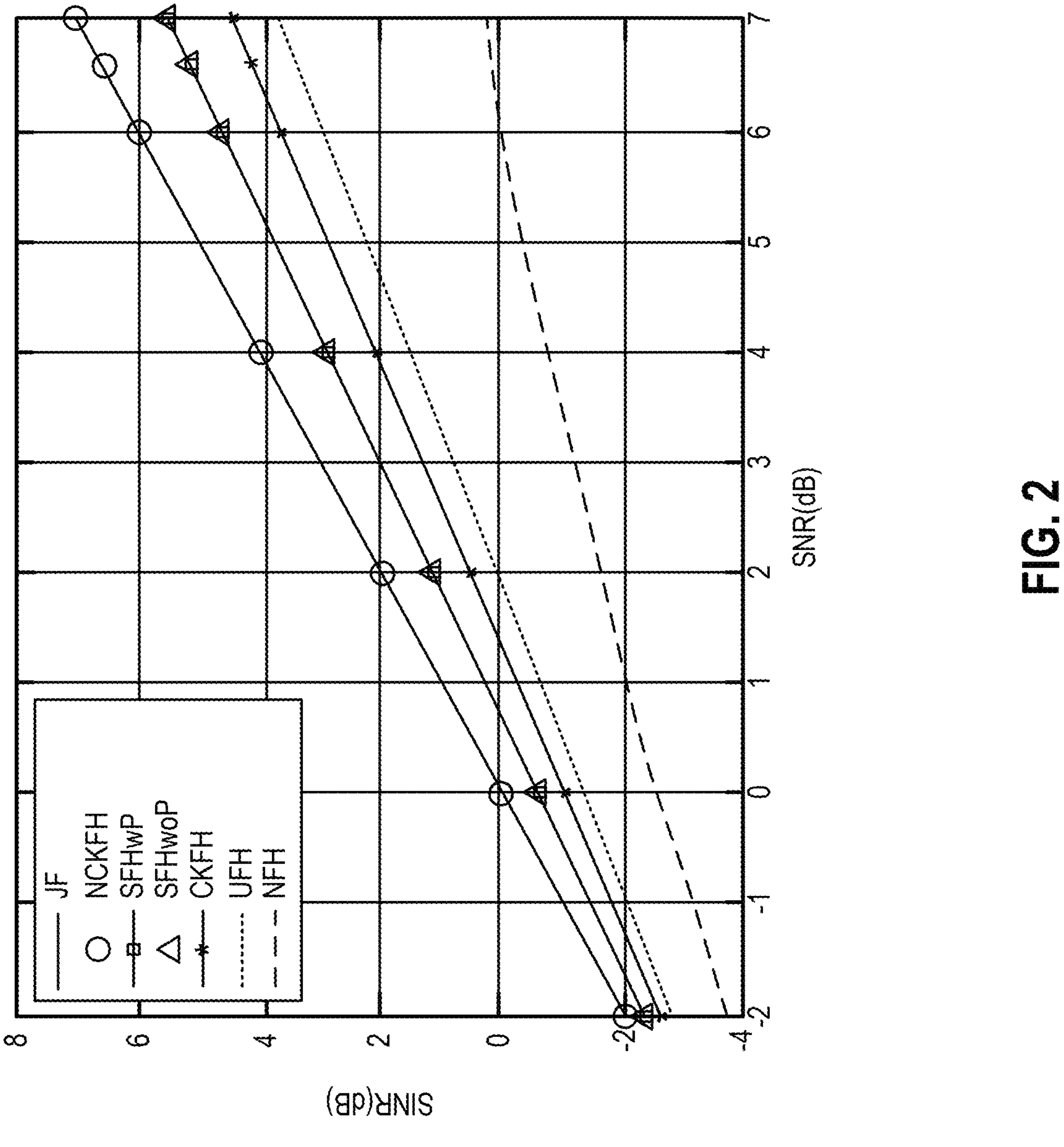
FIGS. 2-4 each illustrate a graph of comparison of different 5G frequency hopping (FH) schemes, in accordance with an illustrative embodiment.
Figure 3:
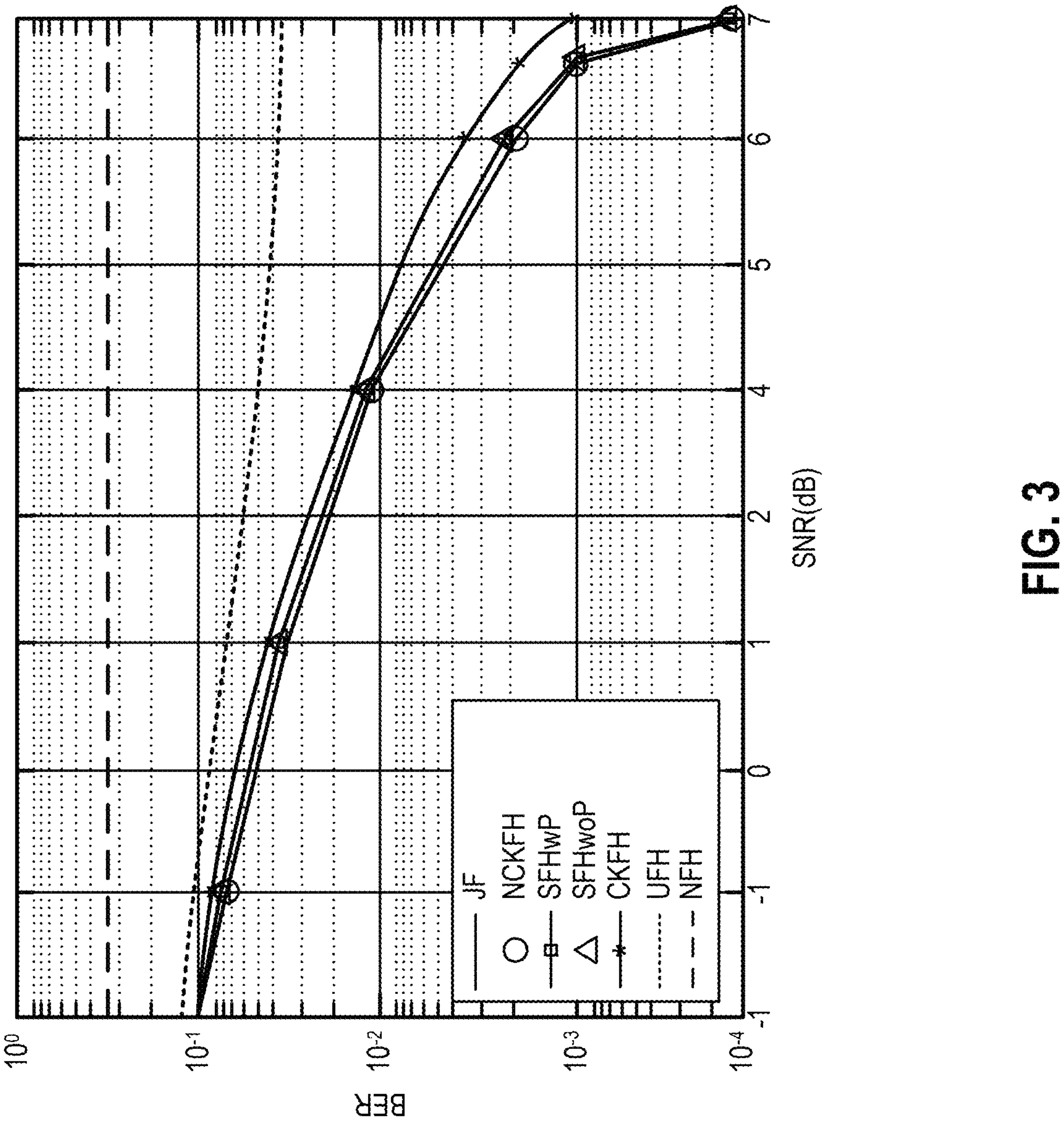
Figure 4:
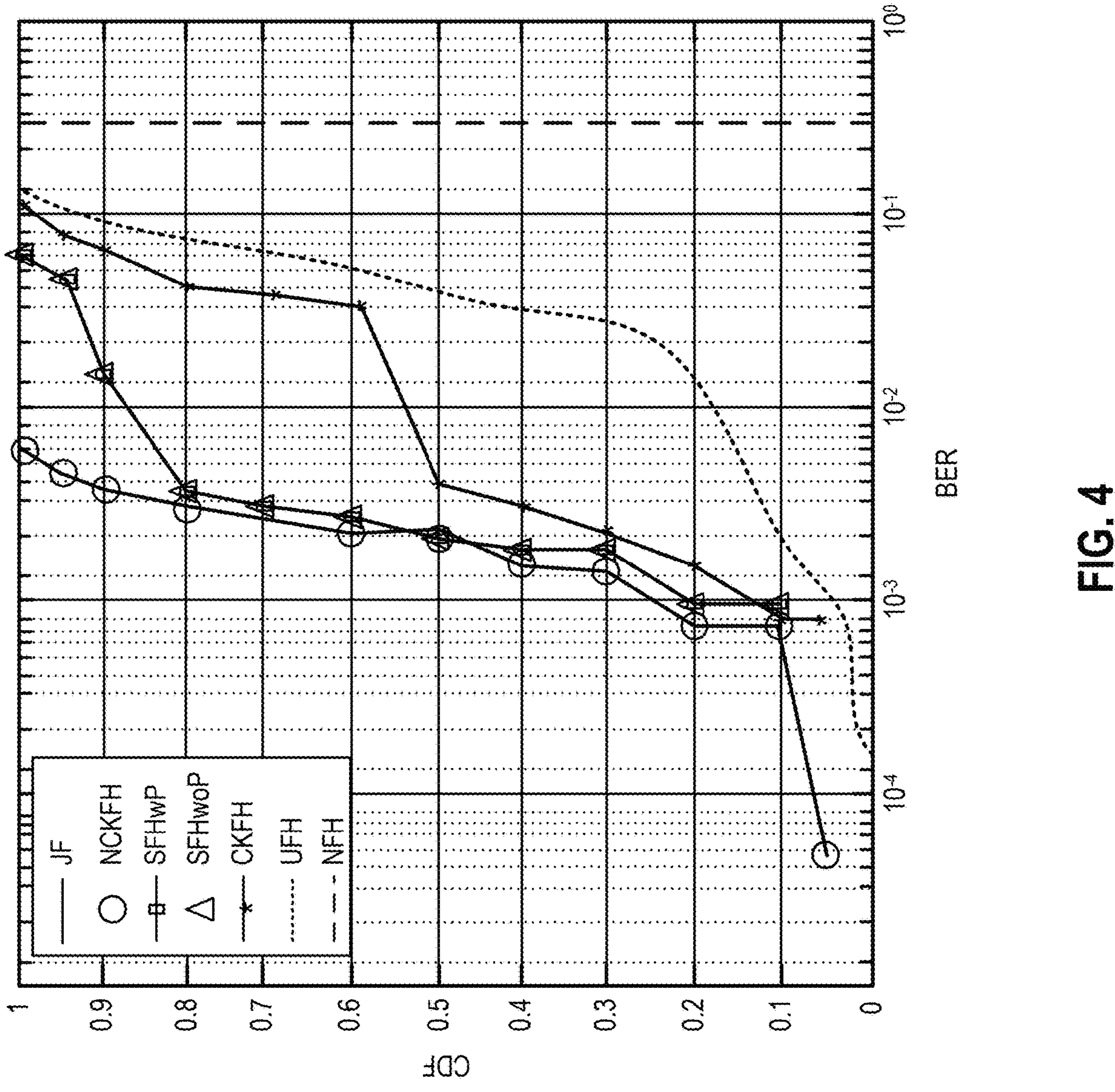

FIGS. 2-4 evaluate the performance of the proposed SFHwP and SFHwoP that are compared with the benchmarking schemes. FIG. 2 shows that the proposed SFHwP and SFHwoP converge to each other, which happens because the empirical interference probability of SFHwoP readily converges to the true probability with the number of iterations. The benchmarking scheme NCKFH in Algorithm 1 has zero interference and thus, overlaps with JF. The CKFH (Algorithm 1) suffers higher interference than SFHwoP (Algorithm 2) as using interference probability is more effective than just using the interference pattern from the previous time slot. Both Algorithms 1 and 2 have better interference mitigation capabilities than UFH because UFH does not exploit any interference information.

FIG. 3 shows the BER performance across different SNR values. All FH schemes show similar BER performance except for the UFH scheme for the best 40% of UEs. This again confirms that the interference information helps to improve the FH performance. FIG. 4 demonstrates the CDF of the BER performance. It is observed that our proposed SFHwP and SFHwoP perform closely to the JF curve for above 80% of UEs. The NFH curve indicates the lower bound performance at which the BER approaches the hit probability (0.3) as the SNR increases. The results demonstrate the efficacy of our FH pattern design using interference statistics (Algorithm 2).

The FH pattern design problem that can be used for 5G NR UEs in the presence of malicious interferers is investigated. Firstly, we demonstrated that minimizing the number of hits is a tractable criterion that allows low complexity algorithms. We analytically showed that it is on par with the max-min-SINR criterion. Then, we proposed two FH schemes leveraging the knowledge of interference. The first scheme utilizes known interference patterns to design a set of FH patterns that are immune to interference. The second scheme leverages interference statistics and minimizes the expected number of hits by interferers. Simulation results demonstrated the efficacy of the proposed schemes, which outperform the uniform FH scheme and achieve near-optimal performance.

In some embodiments, jamming statistics (e.g., a histogram of jamming occurrence at a given frequency bin) may not be used for FH. In certain embodiments, a FH pattern may not be generated. The available 5G signal-to-interference-plus-noise ratio (SINR) report is exploited in this application. Therefore, the complexity is much simpler than existing techniques. This is because it takes longer observation time to generate a reasonably useful jamming histogram than a slot time, which is used in the present disclosure.

The FH in the existing 5G standard may not protect the desired UE signal against a jamming signal but to control the UE spectrum purpose. If the FH is not configured, a resource block (RB) can be assigned by a scheduler, which also does not consider the channel conditions, but take care of only the UE spectrum RB assignments to avoid overlapping with the other active UEs' spectrum assignments.

Figure 5:
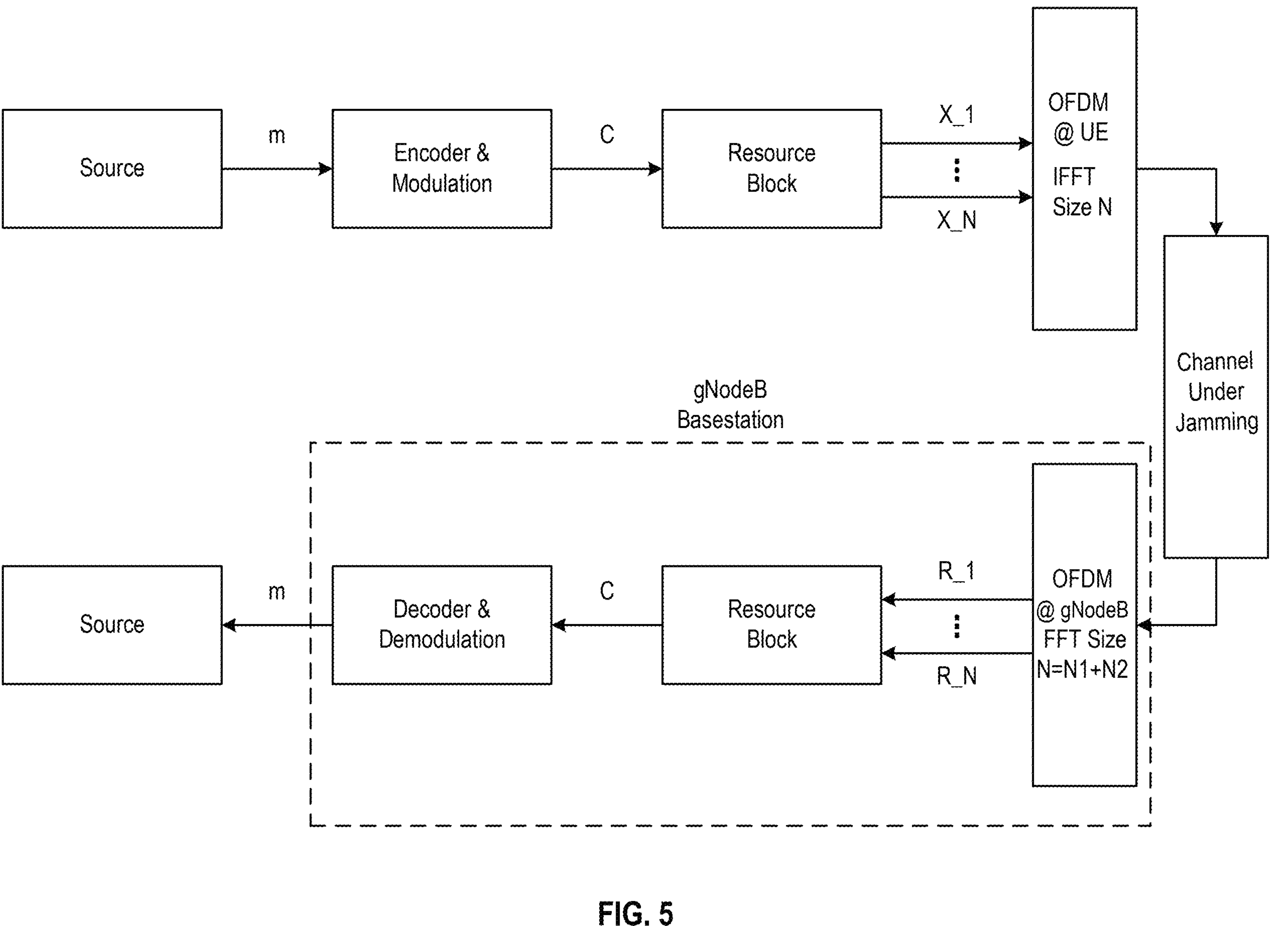
FIG. 5 illustrates an example block diagram of 5G schedular-based communications, in accordance with an illustrative embodiment.

FIG. 5 illustrates an example block diagram of 5G schedular-based communications, in accordance with an illustrative embodiment. Once an RB is assigned, the existing 5G UE uses the entire RB that is assigned. When a jamming signal is present in a signal band and causes errors more than the error correction capability of a channel forward error correction (FEC) code, the UE message may not be delivered correctly. This is because all message symbols in a codeword are interrelated to each other. A single channel FEC encoder may provide an output stream. Refer to the block diagram for a 5G scheduler-based communications without FH in FIG. 5. Regardless of the 5G FH being active or not, the desired UE signals in the existing 5G communications may not be delivered to the destination when a jamming signal is present.

A 5G base station (e.g., a gNodeB) may assign an RB to a customer phone/device, e.g., a 5G UE, in frequency and time domain when the UE is turned on. The assigned frequency band RB may comprise multiple OFDM subcarriers, e.g., 4,096. Each subcarrier carries the message symbol. When jamming signal or interference signal is present in the assigned RB, some OFDM subcarriers show poor channel quality, e.g., a low signal-to-interference-plus-noise ratio (SINR), and the other OFDM subcarriers have high quality, e.g., a high SINR. This SINR report can be required for a UE to report to the connected gNodeB in the 5G standard. In such case, the SINR report can be available for both the UE and the gNodeB. In the present disclosure, the FH scheme is to use a fraction of the assigned RB with high SINR in frequency and time domain for a high priority message transmission by exploiting the available SINR report, and to avoid a jamming signal. The other fraction of the assigned RB with low SINR is to assign for the low priority message transmission which can be damaged by a jamming signal.

B. 5G Frequency Hopping to Communicate Symbols over Channels

Figure 6:
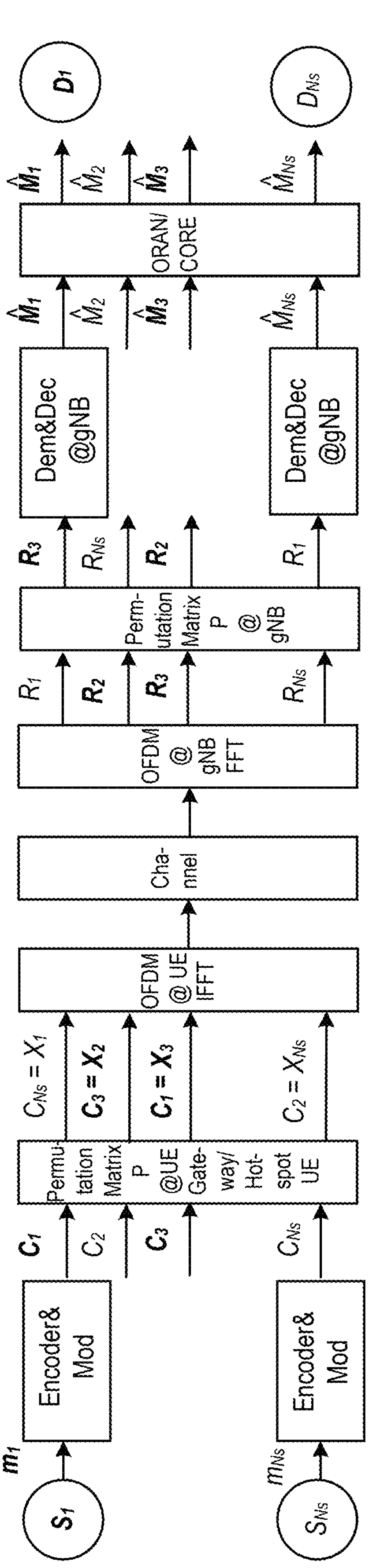
FIG. 6 illustrates a block diagram of 5G frequency hopping (FH) through a channel between a base station (BS) and user equipment (UE), in accordance with an illustrative embodiment.

FIG. 6 illustrates an example 5G frequency hopping (FH) block diagram. First, $S_1, S_2, S_3, \ldots, S_N$ denote the sources which want to transmit their message bit $m_1, m_2, m_3, \ldots, m_N$, respectively, where $N_s$ denotes the number of sources. The message bits in red, for example, $m_1$ and $m_3$d, denote high priority source messages.

Second, each source message bits are encoded by the 5G polar or low-density-parity-check (LDPC) forward error correction (FEC) codes. The encoded bits are modulated by a 5G modulation scheme, for example, 16-ary quadrature-amplitude-modulation (16QAM), and the modulated symbols are denoted by $C_1, C_2, C_3, \ldots, C_N$. For example, coded and modulated symbols $C_1$ and $C_3$ denote high priority symbols.

Third, the 5G user equipment (UE) is required to report its measured signal-to-interference-noise ratio at the orthogonal-frequency-division-multiple (OFDM) reference symbol (RS) subcarriers to the connected 5G base station called a gNodeB every slot interval. For example, subcarriers $X_2$ and $X_3$ in FIG. 1 are high, in other words, these subcarrier channels are good, and likely not jammed or interfered by interference, and the rest of subcarriers are low.

Fourth, the modulated symbols are fed into the OFDM block as the inverse-fast-Fourier-transform (IFFT) input symbols at the UE's medium-access-control (MAC) layer without modifying the 5G standard.

Fifth, high priority symbols, e.g., $C_1$ and $C_3$, may be fed into OFDM subcarrier channel streams with high SINR, e.g., $X_3$ and $X_2$. The subcarriers of high SINR may transmit the high priority message bits.

Sixth, the positions of high SINR subcarriers may be randomly located out of Ns symbol positions. This implies that the high priority message bits are transmitted equivalently to a random frequency-hopping (FH) scheme. Additional implementation complexity and latency are minimal.

Seventh, the existing 5G gNodeB does not utilize the measured SINR report for the subcarrier assignments, even though the SINR report is available every slot at both UE and gNodeB. The existing 5G gNodeB uses the reported SINR for only channel state information (CSI) only. The existing 5G has no distinction among good and bad subcarriers and assigns in order of encoded and modulated symbol order. The reported SINR may be utilized for both OFDM subcarrier assignment and CSI.

Eighth, the gNodeB takes FFT of the received symbols $R_1, R_2, R_3, \ldots, R_N$ through the radio frequency (RF) channel medium, and permutes back to $R_3, R_N, R_2, \ldots, R_1$. Ninth, the gNodeB demodulates and decodes $R_3, R_N, R_2, \ldots, R_1$, and then forwards the demodulated and decoded bits $\hat{m}_1, \hat{m}_2, \hat{M}_3, \ldots, \hat{m}_N$ to the destination nodes $D_1, D_2, D_3, \ldots, D_N$. If the destination nodes are beyond the connected gNodeB coverage area, then the gNodeB can transmit $\hat{m}_1, \hat{m}_2, \hat{m}_3, \ldots, \hat{m}_N$ via CORE network.

Figure 7:
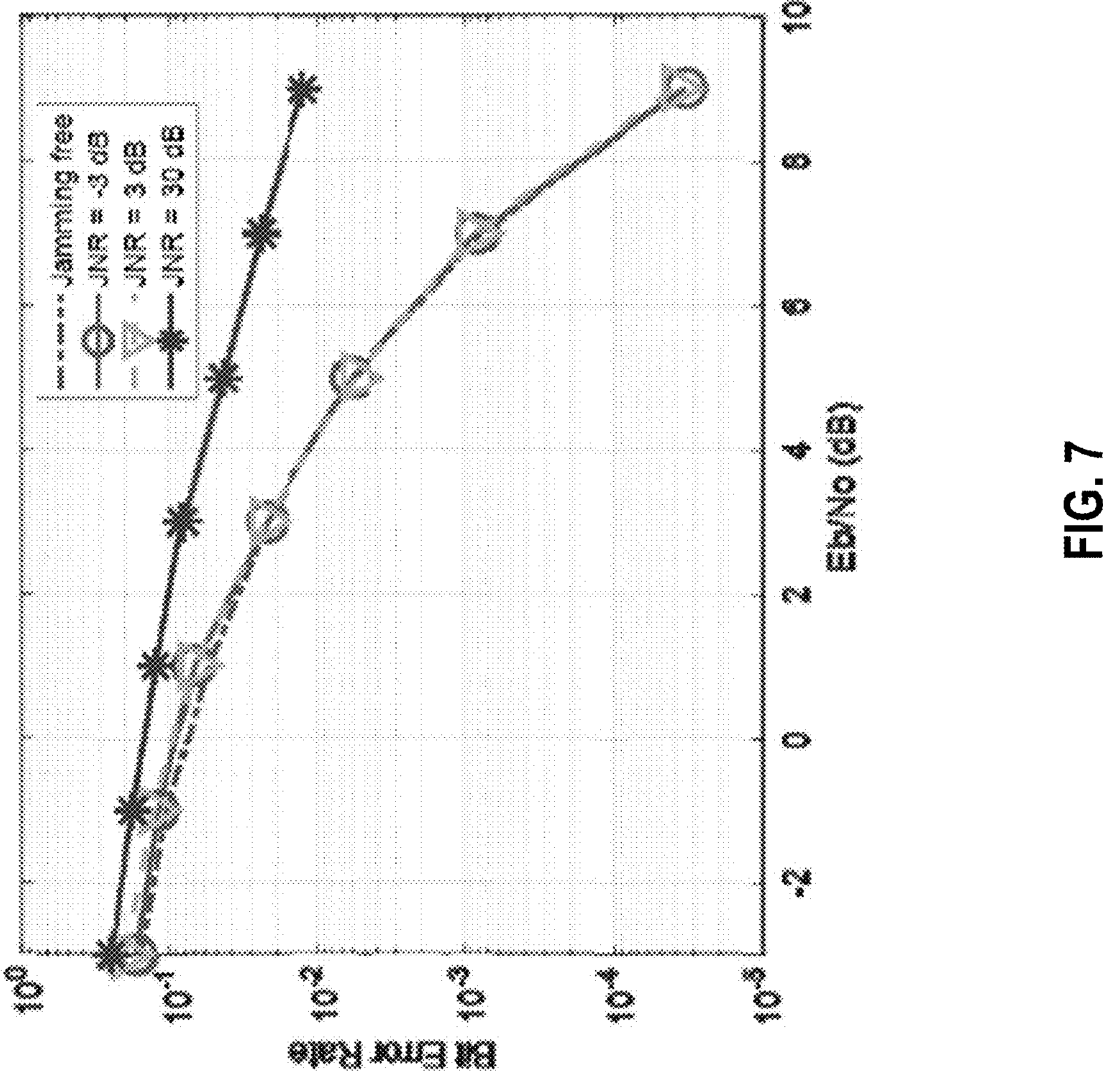
FIG. 7 illustrates a graph of bit error rate (BER) of a high priority source versus bit-energy-to-thermal-noise ratio (Eb/NO), in accordance with an illustrative embodiment.

FIG. 7 shows bit error rate (BER) of the high priority source versus bit-energy-to-thermal-noise ratio ($E_b/N_0$) results for the 5G FH. Here, JNR denotes the signal-to-jamming noise ratio in decibel (dB). If JNR=30 dB, then the signal power is 0 dB=1 Watt and jamming noise power is 30 dB=$10^3$ Watts=1 KWs which implies a very strong jamming with 1000 times higher power than the signal's one. The BER performance becomes poor such as 1 bit is likely to be in error out of 100-bit transmissions at $E_b/N_0$=9 dB. However, if the jamming power is 3 dB=2 times higher than the signal power, the BER is 3 times $10^{-5}$ at $E_b/N_0$=9 dB which is almost equal to the jamming free case. If the FH is not used, then the BER is almost in 0.5, i.e., likely 1 bit is wrong every 2-bit transmissions.

It should be understood that one or more features from the above implementation examples are not exclusive to the specific implementation examples and/or embodiments, but can be combined in any manner (e.g., in any priority and/or order, concurrently or otherwise).

Figure 8:
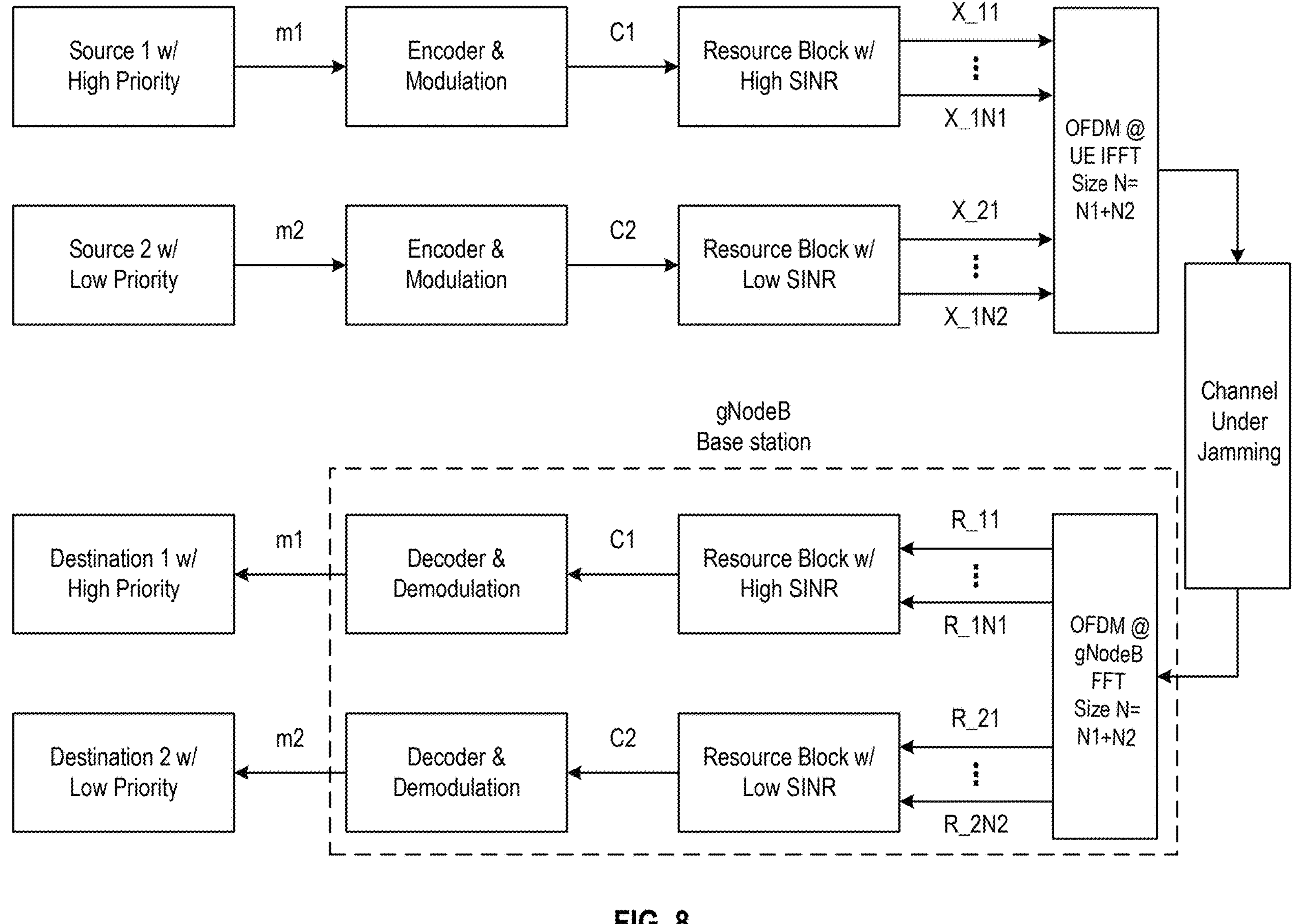
FIG. 8 illustrates an example block diagram of frequency hopping, in accordance with an illustrative embodiment.

FIG. 8 illustrates an example block diagram of frequency hopping, in accordance with an illustrative embodiment. In details, the FH signal scheme may separate data into two (or more) groups, e.g., a high priority UE data and a low priority UE data, by a base station. The base station may send a high priority UE data via orthogonal frequency-division multiplexing (OFDM) subcarriers of high SINR, and a low priority UE data via OFDM subcarriers with low SINR by exploiting the available SINR report, as shown in FIG. 8.

In some embodiments, the receiver may employ two (or more) channel FEC decoders instead of a single FEC decoder so that the high priority UE data and the low priority UE data can be decoded separately. In the present disclosure, for a high priority message may naturally avoid the low-quality OFDM subcarrier channels caused by the jammer and interference. This is because if the jamming signal is present in an OFDM subcarrier channel, the SINR at that OFDM subcarrier channel can be manifested to be low. Therefore, even if an explicit FH pattern is not generated as the FH schemes, the present disclosure provides an effective 5G FH scheme against a jamming signal because a separate channel FEC decoder of high SINR can decode the transmitted message correctly for a high priority message. On the other hand, the message transmission with the existing 5G scheduler can be seriously damaged under a jamming signal because the number of errors becomes larger than the error correction capability of a single FEC. In some embodiments, the present disclosure can be applied for 4G Long Term Evolution (LTE) because the 4G LTE uses a similar orthogonal frequency division multiplexing. In addition, the present disclosure can be applied for 6G because it is foreseen that the similar OFDM can be used in future 6G 3rd Generation Partnership Project (3GPP). In some embodiments, the present disclosure may be applied for communicating messages including encrypted message symbol(s) and/or unencrypted message symbol(s) using OFDM subcarrier channels.

C. Process for Communicating Messages via Channels

Figure 9:
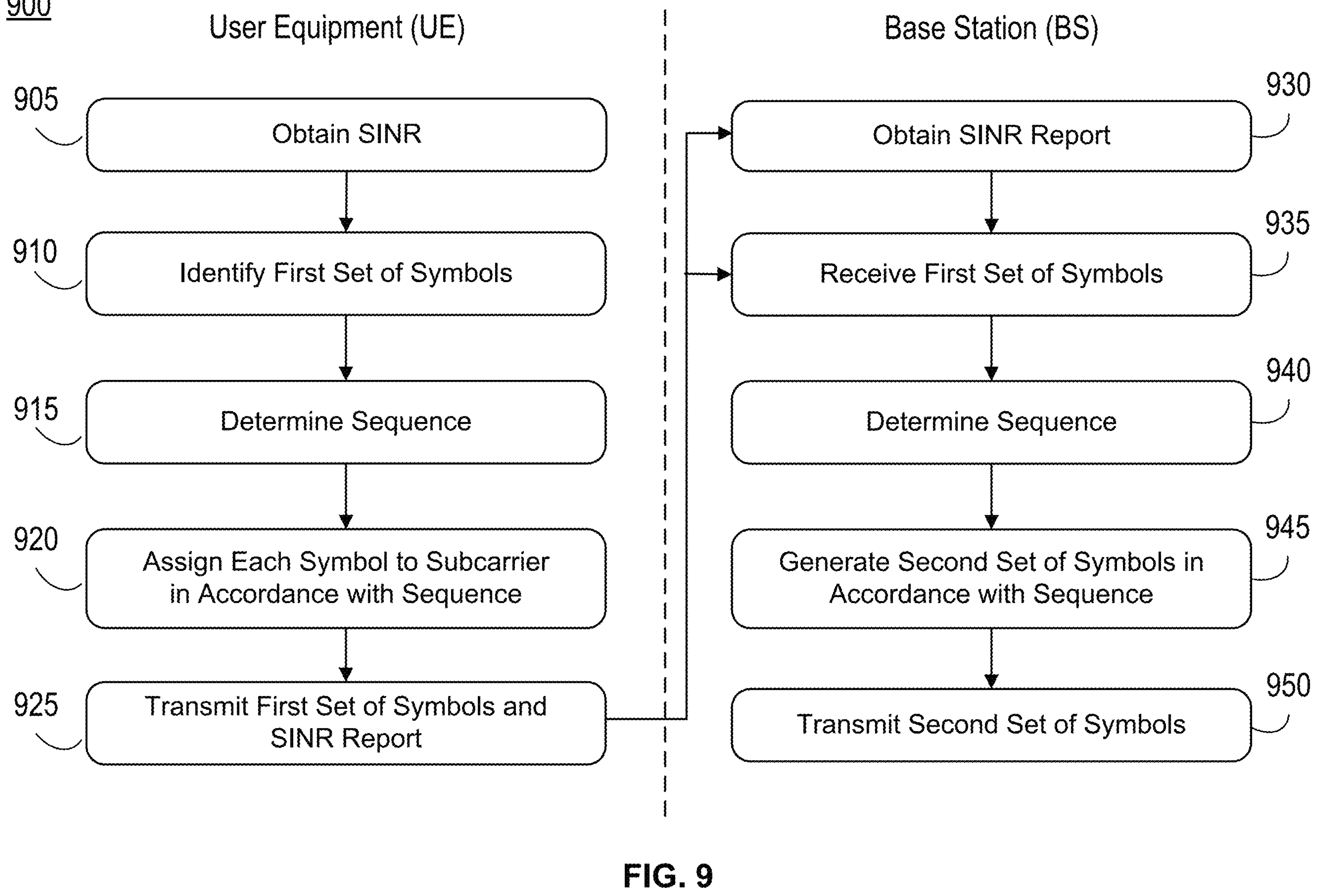
FIG. 9 illustrates a flow diagram for communicating messages via channels, in accordance with an illustrative embodiment.

FIG. 9 illustrates a flow diagram of a method 900 of communicating messages via channels. The method 900 may be implemented using any one or more of the components and devices detailed herein in conjunction with FIGS. 1-8, for example, the user equipment (UE), base station (BS), and core network of FIG. 6. In overview, under the method 900, a user equipment (UE) may obtain a signal-to-interference-noise ratio (SINR) (905). The UE may identify a first set of symbols (910). The UE may determine a sequence for symbols (915). The UE may assign each symbol to a subcarrier in accordance with the sequence (920). The UE may transmit the first set of symbols and a report identifying SINR to a base station (BS) (925). The BS may obtain the report identifying the SINR from the UE (930). The BS may receive the first set of symbols from the UE (935). The BS may determine a sequence for symbols (940). The BS may generate a second set of symbols in accordance with the sequence (945). The BS may transmit the second set of symbols to a core network (950).

In further, a user equipment (UE) may measure, acquire, or otherwise obtain a signal-to-interference-noise ratio (SINR) (905). The SINR may be obtained for each subcarrier of a plurality of subcarriers in a channel between the UE and a base station (BS). The SINR may measure, correspond to, or otherwise identify the power of a given signal relative to interference from other signals and noise in the corresponding subcarrier of the channel. Each subcarrier may correspond to a frequency segment within the channel allocated for transmission of one or more symbols of a message. Each subcarrier may facilitate communication of modulated signals (e.g., in accordance with orthogonal frequency division multiplexing (OFDM)) over the channel. In some embodiments, the UE may measure the SINR in each slot interval of a corresponding subcarrier of the plurality of subcarriers.

The UE may receive, retrieve, or otherwise identify a first set of symbols corresponding to a message to be transmitted to the BS (910). The message may identify or include the first set of symbols. Each symbol in the first set for the message may be an orthogonal frequency division multiplexing (OFDM). symbol, and may have a set length in time. In some embodiments, the UE may determine or identify a priority for symbol of the first plurality of symbols. The priority may define or identify a precedence or significance of data to be communicated in the given symbol of the message.

The UE may calculate, generate, or otherwise determine a sequence for each of the first set of symbols for the message (915). The sequence may specify, define, or identify an order in which to arrange the symbols of the message across the set of subcarriers. The UE may use the SINR for each subcarrier to determine the sequence according to which the first set of symbols are assigned to the plurality of subcarriers. In some embodiments, the UE may determine the sequence using a priority for each symbol of the message. The UE may determine or identify the priority for each symbol from the message. Based on the priority for each symbol and the SINR for each subcarrier, the UE may determine the sequence. In general, the UE may determine the sequence to define symbols with higher priority earlier in order than symbols with lower priority.

The UE may associate, set, or otherwise assign each symbol of the first set of symbols to a corresponding subcarrier in accordance with the sequence (920). In assigning, the UE may rearrange or reorder the first set of symbols. The UE may assign each symbol of the first set of symbols to a corresponding subcarrier of the plurality of subcarriers based on the sequence. In some embodiments, the UE may assign at least one symbol to a particular subcarrier based on both the priority of the symbol and the SINR in the subcarrier. For example, the UE may assign a symbol with a higher priority to a subcarrier with lower SINR and conversely assign a symbol with a lower priority to a subcarrier with a higher SINR.

In some embodiments, the UE may compare the priority of each symbol to a threshold in assigning the symbols to subcarriers. The threshold may identify, delineate, or otherwise define a value for the priority at which to assign the symbol to a subcarrier with a high SINR. The subcarrier with a high SINR may correspond to one which has a SINR higher than a threshold (e.g., top 10% of SINR values). If the symbol is determined to have a priority higher than or equal to the threshold, the UE may assign the symbol to one of the high SINR subcarriers in the channel. Otherwise, if the symbol is determined to have a priority lower than the threshold, the UE may refrain from assigning the symbol to one of the high SINR subcarriers, and instead assign the symbol to one of the low SINR subcarriers (e.g., the subcarrier with an SINR lower than the threshold).

The UE may send, provide, or otherwise transmit the first set of symbols and a report identifying SINR to the BS (925). In transmitting, the UE may reorder the first set of symbols according to the assignments to the subcarriers. In addition, the UE may perform the transmission in accordance with orthogonal frequency division multiplexing (OFDM). In some embodiments, the UE may perform modulation (e.g., quadrature amplitude modulation (QAM)), encoding (e.g., error correction coding), or transformation (e.g., fast Fourier transform) on the first set of symbols prior to transmission. The transmission of the first set of symbols may be in accordance with frequency hopping (FH) techniques. In some embodiments, the UE may transmit, to the BS, the first plurality of symbols via the set of subcarriers in the channel along with (ii) the report identified the SINR for each subcarrier of the set of subcarriers. In some embodiments, the transmission of the first set of symbols via the set of subcarriers in the channel the symbols and (ii) the report identified the SINR for each subcarrier of the set of subcarriers can be performed separately. In some embodiments, the report may include a number of hits in a given time interval.

The BS may receive, identify, or otherwise obtain the report identifying the SINR from the UE (930). The BS may obtain, from a UE, a report identifying a signal-to-interference-noise ratio (SINR) for each subcarrier of a plurality of subcarriers in a channel between the BS and the UE. In some embodiments, the report may identify the SINR in each slot interval of a corresponding subcarrier of the plurality of subcarriers.

The BS may retrieve, identify, or otherwise receive the first set of symbols from the UE via the corresponding set of subcarriers in the channel (935). The BS may receive each symbol of the first set of symbols from the UE through a corresponding subcarrier in the set of subcarriers over the channel. Upon receipt, the BS may identify the received symbols as belonging to the first set of symbols for a message.

The BS may derive, identify, or determine a sequence for symbols based on the SINR identified in the report (940). The BS may use the SINR for each subcarrier of the set of subcarriers identified in the report to determine the sequence. The sequence may have been an order or arrangement according to which the first set of symbols were assigned by the UE to the set of subcarriers. In some embodiments, at least one symbol in the first plurality of symbols may have been assigned by the UE to the subcarrier (e.g., one of the subcarriers with low SINR) of the set of subcarriers based on the priority (e.g., above a threshold) and the SINR.

The BS may produce, determine, or otherwise generate a second set of symbols in accordance with the sequence (945). The BS may generate the second set of symbols by reordering the first set of symbols in accordance with the sequence determined from the SINR. The second set of symbols may correspond to the recovered, original order of the symbols for the message. The BS may send, provide, or otherwise transmit the second set of symbols to a core network (950). In transmitting, the BS may perform demodulation (e.g., QAM demodulation), decoding (e.g., error correction), or transformation (e.g., fast Fourier transform) on the second set of symbols prior to transmission to the core network.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A system or method for communicating messages via channels, comprising:

obtaining, by a base station (BS) from a user equipment (UE), a report identifying a signal-to-interference-noise ratio (SINR) for each subcarrier of a plurality of subcarriers in a channel between the BS and the UE;

receiving, by the BS, via the plurality of subcarriers in the channel, a corresponding first plurality of symbols corresponding to a message from the UE;

determining, by the BS, using the SINR for each subcarrier of the plurality of subcarriers identified in the report, a sequence according to which the first plurality of symbols are assigned to the plurality of subcarriers;

generating, by the BS, a second plurality of symbols by reordering the first plurality of symbols in accordance with the sequence; and transmitting, by the BS, the second plurality of symbols to a core network to obtain the message.

B. The system or method for Paragraph A, wherein generating the second plurality of symbols further comprises performing at least one of a demodulation or a decoding on the first plurality of symbols reordered in accordance with the determined sequence.

C. The system or method for any one or more of Paragraphs A or B, wherein determining the sequence further comprises determining a priority for at least one symbol of the first plurality of symbols based on a corresponding subcarrier of the plurality subcarriers via which the at least one symbol is received.

D. The system or method for any one or more of Paragraphs A-C, wherein at least one symbol in the first plurality of symbols is assigned to a subcarrier of the plurality of subcarriers based on the SINR in the subcarrier being above a threshold.

E. The system or method for any one or more of Paragraphs A-D, wherein the report identifies the SINR in each slot interval of a corresponding subcarrier of the plurality of subcarriers.

F. The system or method for any one or more of Paragraphs A-E comprising:

determining, by the BS, using the SINR for each subcarrier of the plurality of subcarriers identified in the report, at least one resource block for transmitting the second plurality of symbols.

G. The system or method for any one or more of Paragraphs A-F, wherein the SINR is determined according to at least one of: a signal power of the UE, an interference power, or a noise power.

H. The system or method for any one or more of Paragraphs A-G, wherein the report comprises a number of successful transmissions for the UE in a time interval.

I. The system or method for any one or more of Paragraphs A-I, wherein the report comprises a number of hits in a time interval.

J. The system or method for any one or more of Paragraphs A-I, wherein the message is an encrypted message.

K. A system or method for communicating messages via channels, comprising:

obtaining, by a user equipment (UE), a signal-to-interference-noise ratio (SINR) for each subcarrier of a plurality of subcarriers in a channel between the UE and a base station (BS);

identifying, by the UE, a first plurality of symbols corresponding to a message to be transmitted to the BS via the channel;

determining, by the UE, using the SINR for each subcarrier of the plurality of subcarriers, a sequence according to which the first plurality of symbols are assigned to the plurality of subcarriers;

assigning, by the UE, each symbol of the first plurality of symbols to a corresponding subcarrier of the plurality of subcarriers in accordance with the sequence; and transmitting, by the UE to the BS, (i) the first plurality of symbols via the plurality of subcarriers in the channel and (ii) a report identified the SINR for each subcarrier of the plurality of subcarriers.

L. The system or method for Paragraph K, further comprising identifying, by the UE, a priority for at least one symbol of the first plurality of symbols.

M. The system or method for any one or more of Paragraphs K or L wherein assigning further comprises assigning the at least one symbol to a subcarrier of the plurality of subcarriers based on (i) the priority of the at least one symbol and (ii) the SINR in the subcarrier being above a threshold.

N. The system or method for any one or more of Paragraphs K-M, further comprising performing, by the UE, at least one of modulation or encoding on the first plurality of symbols reordered in accordance with the sequence.

O. The system or method for any one or more of Paragraphs K-N, wherein obtaining the SINR further comprises obtaining the SINR in each slot interval of a corresponding subcarrier of the plurality of subcarriers.

P. The system or method for any one or more of Paragraphs K-O, comprising:

determining, by the UE, using the SINR for each subcarrier of the plurality of subcarriers identified in the report, at least one resource block for transmitting the first plurality of symbols.

Q. The system or method for any one or more of Paragraphs K-P, wherein the SINR is determined according to at least one of: a signal power of the UE, an interference power, or a noise power.

R. The system or method for any one or more of Paragraphs K-Q, wherein the report comprises a number of successful transmissions for the UE in a time interval.

S. The system or method for any one or more of Paragraphs K-R, wherein the report comprises a number of hits in a time interval.

T. The system or method for any one or more of Paragraphs K-S, wherein the message is an encrypted message.

Other embodiments are set forth in the following claims, along with the full scope of equivalents to which such claims are entitled.

What is claimed is:

1. A method of communicating messages via channels, comprising:

obtaining, by a base station (BS) from a user equipment (UE), a report identifying a signal-to-interference-noise ratio (SINR) for each subcarrier of a plurality of subcarriers in a channel between the BS and the UE;

receiving, by the BS, via the plurality of subcarriers in the channel, a corresponding first plurality of symbols corresponding to a message from the UE;

determining, by the BS, using the SINR for each subcarrier of the plurality of subcarriers identified in the report, a sequence according to which the first plurality of symbols is assigned to the plurality of subcarriers;

generating, by the BS, a second plurality of symbols using the first plurality of symbols in accordance with the sequence; and transmitting, by the BS, the second plurality of symbols to a core network to obtain the message.

2. The method of claim 1, wherein generating the second plurality of symbols further comprises performing at least one of a demodulation or a decoding on the first plurality of symbols reordered in accordance with the determined sequence.

3. The method of claim 1, wherein determining the sequence further comprises determining a priority for at least one symbol of the first plurality of symbols based on a corresponding subcarrier of the plurality subcarriers via which the at least one symbol is received.

4. The method of claim 1, wherein at least one symbol in the first plurality of symbols is assigned to a subcarrier of the plurality of subcarriers based on the SINR in the subcarrier being above a threshold.

5. The method of claim 1, wherein the report identifies the SINR in each slot interval of a corresponding subcarrier of the plurality of subcarriers.

6. The method of claim 1, comprising:

determining, by the BS, using the SINR for each subcarrier of the plurality of subcarriers identified in the report, at least one resource block for transmitting the second plurality of symbols.

7. The method of claim 1, wherein the report comprises a number of successful transmissions for the UE in a time interval.

8. A method of communicating messages via channels, comprising:

obtaining, by a user equipment (UE), a signal-to-interference-noise ratio (SINR) for each subcarrier of a plurality of subcarriers in a channel between the UE and a base station (BS);

identifying, by the UE, a first plurality of symbols corresponding to a message to be transmitted to the BS via the channel;

determining, by the UE, using the SINR for each subcarrier of the plurality of subcarriers, a sequence according to which the first plurality of symbols are assigned to the plurality of subcarriers;

assigning, by the UE, each symbol of the first plurality of symbols to a corresponding subcarrier of the plurality of subcarriers in accordance with the sequence; and transmitting, by the UE to the BS, (i) the first plurality of symbols via the plurality of subcarriers in the channel and (ii) a report identified the SINR for each subcarrier of the plurality of subcarriers.

9. The method of claim 8, further comprising identifying, by the UE, a priority for at least one symbol of the first plurality of symbols.

10. The method of claim 9, wherein assigning further comprises assigning the at least one symbol to a subcarrier of the plurality of subcarriers based on (i) the priority of the at least one symbol and (ii) the SINR in the subcarrier being above a threshold.

11. The method of claim 8, further comprising performing, by the UE, at least one of modulation or encoding on the first plurality of symbols reordered in accordance with the sequence.

12. The method of claim 8, wherein obtaining the SINR further comprises obtaining the SINR in each slot interval of a corresponding subcarrier of the plurality of subcarriers.

13. The method of claim 8, comprising:

determining, by the UE, using the SINR for each subcarrier of the plurality of subcarriers identified in the report, at least one resource block for transmitting the first plurality of symbols.

14. The method of claim 8, wherein the report comprises a number of successful transmissions for the UE in a time interval.

15. A system for communicating messages via channels, comprising:

a base station (BS) comprising one or more processors coupled with memory, configured to:

obtain, from a user equipment (UE), a report identifying a signal-to-interference-noise ratio (SINR) for each subcarrier of a plurality of subcarriers in a channel between the BS and the UE;

receive, via the plurality of subcarriers in the channel, a corresponding first plurality of symbols corresponding to a message from the UE;

determine, using the SINR for each subcarrier of the plurality of subcarriers identified in the report, a sequence according to which the first plurality of symbols are assigned to the plurality of subcarriers;

generate a second plurality of symbols using the first plurality of symbols in accordance with the sequence; and transmit the second plurality of symbols to a core network to obtain the message.

16. The system of claim 15, wherein the BS is further configured to perform at least one of a demodulation or a decoding on the first plurality of symbols reordered in accordance with the determined sequence.

17. The method of claim 15, wherein the BS is further configured to determine a priority for at least one symbol of the first plurality of symbols based on a corresponding subcarrier of the plurality subcarriers via which the at least one symbol is received.

18. The system of claim 15, wherein at least one symbol in the first plurality of symbols is assigned to a subcarrier of the plurality of subcarriers based on the SINR in the subcarrier being above a threshold.

19. The system of claim 15, wherein the report identifies the SINR in each slot interval of a corresponding subcarrier of the plurality of subcarriers.

20. The system of claim 15, wherein the BS is further configured to determine, using the SINR for each subcarrier of the plurality of subcarriers identified in the report, at least one resource block for transmitting the second plurality of symbols.

* * * * *